United States Patent Office 3,681,074
Patented Aug. 1, 1972

3,681,074
PRODUCTION OF COLOURED COLLOID PATTERNS

Albert Lucien Poot, Kontich, Belgium, assignor to Agfa-Gevaert N.V., Mortsel, Belgium No Drawing. Filed June 30, 1970, Ser. No. 51,335
Claims priority, application Great Britain, July 21, 1969, 36,580/69
Int. Cl. G03c 5/00, 1/58
U.S. Cl. 96—35 30 Claims

ABSTRACT OF THE DISCLOSURE

Coloured colloid patterns are produced by means of colored hydrophilic colloid layers containing a diazonium compound which by exposure to activating electromagnetic radiation decomposes to give products providing a decrease in hardenability of a colloid of said layers.

To produce a multicolour print, differently coloured hydrophilic colloid layers containing said diazonium compound are used, such layers being transferred successively from a temporary support to a common permanent support and exposed in registration building up after treatment with a hardening agent for the colloid and wash-off of the exposed non-hardened portions of each differently coloured colloid layer, a multicolor print.

The colloid layers are preferably coloured with water-insoluble pigments applied in a determined amount in their coating compositions.

The present invention relates to a recording and reproduction process for producing coloured colloid patterns corresponding with information-wise modulated electromagnetic radiation. The present invention more particularly relates to a process for producing direct positive halftone and line-work multicolour polymeric images and to materials used therefor.

The production of halftone colour images is of interest in the field of design, e.g. in the production of colour decorative patterns, colour wiring and circuit diagrams, cartography, colour proofing and in the production of transparencies for dia- or overhead-projection.

Especially in the colour field of the graphic art there is a great need for a simple and fast technique offering "colour proofs" of high quality and reproducibility.

Colour proofing materials serve to produce a showing proof for submission to the printer and his client to give an idea of a multicolour halftone reproduction as will be produced by the successive printing in register with the separate standard inks: yellow, magneta, cyan, and black.

The colour proof makes it possible to determine whether corrections have to be made to the separation halftone transparencies with the aid of which the printing masters have to be produced.

Known colour proofing system can be divided into two classes viz those producing positive copies of the image to be printed starting from halftone separation negatives (negatively working colour proofing) and those producing positive copies of the image to be printed starting from halftone separation positives (positively working colour proofing).

Whether negative or positive halftone separation transparencies have to be used in the production of a printing form, depends on the photochemical properties (photo-hardening or photosolubilization) of the photoresist coating and the type of processing to yield a positive printing master.

According to known photo-hardening processes coloured hardened colloid patterns corresponding with electromagnetic radiation patterns are produced and developed to relief patterns by means of an aqueous liquid using a nonlight-sensitive hydrophilic colloid or polymer, which is insolubilized or cross-linked by means of a compound that is produced by irradiation of a photo-sensitive compound. So e.g. dichromated hydrophilic colloid layers e.g. layers containing dichromated gelatin or gum arabic (ref. P. Glafkidès, Photographic Chemistry, Fountain Press, London, vol. II (1960), pp. 669–674) are used in so-called negatively working colour proofing operating with negative halftone separation transparencies.

In the photographic colour proofing technique described in the United Kingdom patent specification 879,049 filed Feb. 12, 1960 by General Aniline & Film Coporation a positively working colour film is applied, which is based on imagewise colour coupler diffusion. The processed films may be used singly or in overlays.

The use of images in overlay offers a less good imitation of the final printing results since the mono-colour halftone transparencies must be laid in register and inspected diascopically or against an opaque background. Further as is generally known diffusion processes cannot guarantee a very high image sharpness for always a lateral diffusion of the transferred compounds takes place.

It is one of the objects of the present invention to provide a recording and reproduction process suited for the production of coloured colloid patterns having the same image values as the original applied in the exposure.

Thus, the present invention is especially useful for producing positive monocolour copies of positive originals.

It is another object of the present invention to provide multicolour proofs built up in an economic, highly reproducible and easy way by coloured colloid reliefs superposed on one and the same permanent support.

According to the present invention the production of the coloured positive colloid reliefs is based on the use of diazonium compounds that on exposure to activate electromagnetic radiation yield a substance that inhibits the hardening of a proper hydrophilic colloid by means of an aldehyde hardening agent known for that purpose in protein chemistry, and is based on the production of the relief image by means of the aqueous wash-off of the non-hardened portions.

The process of the present invention for producing a coloured colloid pattern, comprises the steps of:

(1) Information-wise exposing a dyed or pigmented hydrophilic colloid layer containing a diazonium compound, which layer undergoes an information-wise decrease in hardenability with an aldehyde and improved removability with water in the exposed portions, and (2) Selectively removing the exposed portions of the colloid layer by means of a wash-off treatment. The selectivity of the removal of the exposed portions is improved by a treatment with an aldehyde hardening agent following the information-wise exposure.

According to an embodiment of the present invention for producing multicolour patterns coloured electromagnetic radiation-sensitive hydrophilic colloid layers are used on a temporary support. The coating composition contains already in the coating stage (a) diffusion resistant colouring substances(s) and (a) relatively stable (in comparison with dichromated gelatin) radiation-sensitive diazonium compound(s) in a desired amount. In other words no colouring or light-sensitive ingredients are introduced by diffusion or imbibition, which is difficult to control the yield less reproducible results. Moreover, the exposure of the colloid layers can be produced in substantially dry state, which excludes chemical attack of the exposure apparatus and offers a real advantage to the operating personnel.

According to a characterizing aspect of the most preferred embodiment of the present invention superposed multilayer coloured colloid patterns are produced by transfer of the non-exposed coloured colloid layers to a same permanent support wherein each of the transferred colloid layers after its image-wise exposure in register to active electromagnetic radiation is hardened in the non-exposed areas by means of an aqueous hardening treatment, as a result of which the hardened colloid portions become anchored to underlying colloid portions or parts of an underlying colloid-containing layer e.g. a hydrophilic subbing layer. Any possible frilling off of the coloured colloid coating during wash-off development, which is so common a difficulty in processes involving a wash-off treatment of transferred colloid coatings, is overcome in this way.

According to another aspect of a preferred embodiment of the present invention, which relates to the production of high-quality multi-colour images, differently coloured electromagnetic radiation-sensitive hydrophilic colloid layers are transferred in wet state from a temporary supoprt to a single permanent suport, which—when used in colour proofing—is preferably an opaque hydrophilic or hydrophilized supoprt resembling the printing stock as much as possible. Each transferred colloid layer is exposed separately in register on the single permanent support through a properly selected separation positive while directing the exposed colloid layer to the radiation source during the exposure.

The process of the present invention for the production of (a) coloured colloid pattern(s), wherein (a) hydrophilic coloured colloid layer(s) containing a diazonium compound is (are) used, which layer(s) is (are) made better removable in its (their) electromagnetically irradiated portions by means of an information-wise exposure to active electromagnetic radiation, comprises the steps of:

(1) Transferring a coloured hydrophilic colloid layer, which contains a diazonium compound and a hydrophilic colloid that undergoes a decrease in water-solubility when treated with an aldehyde, from a temporary support, which is relatively hydrophobic in respect of a permanent support to which said layer has to be transferred, to said permanent support by pressing it in the presence of an aqueous liquid (in other words in moist or dampened state) against said colloid layer, and removing the temporary support, thus leaving said layer on the permanent support, (2) Exposing the transferred colloid layer in substantially dry state to active electromagnetic radiation, which is modulated according to the information to be recorded, (3) Developing the exposed layer by washing off with an aqueous liquid forming a coloured relief pattern, corresponding with the non-exposed portions, and—when superposed coloured colloid patterns on a single permanent support have to be produced—repeating the steps (1), (2), and (3) with said hydrophilic colloid layers having an arbitrary colour.

In order to avoid an overall frilling off of the coloured colloid layer(s) during wash-off development a selective hardening of the non-exposed portions is carried out before the exposed portions are removed. Such is realized by using in the recording layer a water-soluble polymeric compound that can be hardened by means of an aldehyde-hardening agent for gelatin. It is assumed that by the exposure of the diazonium compound a photodecomposition product is formed, which inhibits the aldehyde-hardening of colloids containing active hydrogen atoms such as gelatin.

So, a preferably used recording material comprises (a) hydrophilic coloured (e.g. pigmented) colloid layer(s) that contain(s)

(A) A water-soluble polymeric compound that undergoes hardening by means of an aldehyde, e.g. formaldehyde, and which hardening is inhibited by means of a photodecomposition product of a diazonium compound, and (B) A diazonium compound which on exposure to active electromagnetic radiation yields such photodecomposition product.

According to a preferred embodiment of the process according to the present invention multicolour patterns are produced by the steps of:

(1) Transferring a coloured hydrophilic colloid layer from a temporary support to a permanent support by pressing it in the presence of an aqueous liquid against the said layer and removing the temporary support, thus leaving the colloid layer on the permanent support, wherein the said colloid layer comprises:

(A) a water-soluble polymeric compound, which undergoes hardening by means of an aldehyde and the hardening of which is inhibited by means of a photocomposition product of a diazonium compound, and (B) a diazonium compound by means of which on exposure to active electromagnetic radiation such a photodocomposition product is formed, (2) After drying, exposing the transferred colloid layer to active electromagnetic radiation, which is modulated according to the information to be recorded and as a result of which said diazonium compound information-wise photodecomposed, (3) Treating the exposed colloid layer with an aldehyde-hardening agent, which hardens the said polymeric compound in the non-exposed portions, (4) Removing the exposed portions of the colloid layer by a washoff treatment, and when superposed colour patterns on a same permanent support have to be produced, repeating the steps (1), (2), (3) and (4) with said hydrophilic colloid layers having an arbitrary colour.

Preferably the information-wise exposure is a contact exposure carried out through a transparency, which can be a halftone or a line-work transparency. The exposure for producing multicolour reproductions is an exposure in register, which is preferably carried out with appropriately selected separation positives held in contact with the radiation-sensitive colloid layer.

Diazo compounds which are illustrative of the type suitable for practising the invention are derived from 1,2- and 2,1-amino naphthols, 1,4-amino naphthols and aromatic p-diamines of the benzene series, particularly p-phenylenediamines which are mono- or disubstituted at one of the two amino groups. These light-sensitive diazo compounds are commonly used in the production of diazotype images. Suitable diazo compounds are:

p-diazo-diphenylamine sulphate
p-diazo-dimethylaniline chloride·zinc chloride
p-diazo-diethylaniline chloride·zinc chloride
p-diazo-ethyl-hydroxyethyl aniline chloride·½ zinc chloride
p-diazo-methyl-hydroxyethyl aniline chloride·½ zinc chloride
p-diazo-ethyl-benzylaniline chloride·½ zinc chloride
p-diazo-2,5-diethoxy-benzoylaniline chloride·½ zinc chloride
p-diazo-dimethylaniline borofluoride
p-diazo-2,5-dibutoxy-benzoylaniline chloride·½ zinc chloride
p-diazo-1-morpholinobenzene chloride·½ zinc chloride
p-diazo-2,5-dimethoxy-1-p-toluyl-mercaptobenzene chloride·½ zinc chloride
p-diazo-3-ethoxy-diethylaniline chloride·½ zinc chloride
2,5,4′-triethoxy-diphenyl-4-diazonium oxolate
p-diazo diethyl aniline chloride·½ zinc chloride
p-diazo-2,5-dibutoxy-1-morpholino-benzene chloride·zinc chloride
p-diazo-2,5-dimethoxy-1-morpholino-benzene chloride·-zinc chloride
p-diazo-2,5-diethoxy-1-morpholino-benzene chloride·-zinc chloride
p-diazo-diethylaniline borofluoride
p-diazo-2-chloro-acetylaniline chloride·½ zinc chloride
p-diazo-2-methyl-diethylaminobenzene chloride·zinc chloride p-diazo-2-methyl-ethylaminobenzene chloride·zinc chloride
p-diazo-3-methyl-diethylaminobenzene chloride·½ zinc chloride
p-diazo-3,5-dimethyl-dimethylaminobenzene chloride·½ zinc chloride, or
p-diazo-2-chloro-diethylaminobenzene chloride·½ zinc chloride The preferred diazo compounds are employed in the form of their stabilized salts as exemplified by p-diphenylamine diazonium sulphate, or in the form of their zinc chloride or boron trifluoride double salts.

The selectivity of hardening of the colloid layer increases with rising concentrations of photosensitive diazonium compound. The amount of diazonium compound that can be incorporated is limited by the concentration at which crystallisation of said compound in the colloid layer starts. Consequently, preferably the best water-soluble diazonium compounds are used or mixtures of these compounds that do not so easily crystallize. Preferably the photosensitive coloured colloid layer contains 15 to 40% by weight of the diazonium compound calculated on the weight of the dry hydrophilic colloids(s), preferably gelatin.

Preferably used aldehyde-hardenable colloids are hydrophilic water-soluble colloid polymers containing active hydrogen atoms as are present, e.g., in hydroxyl groups and amino groups. Both qualitative characterization and quantitative determination of active hydrogen can be carried out by the procedure known as the Zerewitinoff active hydrogen determination. Hardenable colloids containing active hydrogen atoms are, e.g., polyvinyl alcohol, polyacrylamide or gelatin, and other film or stratum-forming proteinaceous colloids.

In the present invention best results are obtained with aldehyde-hardenable hydrophilic water-soluble colloids that possess the property of sol-gel transformation such as gelatin, which offers an easy transfer and good adherence of the photosensitive layer to the permanent support. Sol-gel transformation is explained by R. J. Croome and F. G. Clegg in "Photographic Gelatin," The Focal Press, London (1965), pages 37–39.

The above hydrophilic colloids may be used in admixture with proper latent hardening agents and cross-linking agents that split off an hardening species on heating, e.g. latent polyisocyanates as described in the United Kingdom patent specifications 991,676 filed Jan. 18, 1963 and 1,058,425 filed June 15, 1964 both by Gevaert Photo-Producten N.V.

In the production of superposed multicolour colloid patterns the dyes used in the photosensitive colloid layers have to be resistant to diffusion and chemically inert in the processing and washing liquid(s) as much as possible. When being used in colourproofing they have to match with the absorption spectrum of the standard process inks as close as possible. Particulars about standard colour inks can be found in H.M. Cartwright, Ilford Graphic Arts Manual (1962), vol. 1, pages 502 to 504.

There exist "cold" and "warm" colour standards. Cold colour tones are, e.g. standarized in the U.S.A. in the GATF-Color Charts and in the German Standards DIN 16508 and 16509. Warm colour tones are standardized, e.g., in the German Standard DIN 16538.

The cold colour standards are characterized by the use of fairly pure magenta pigments, mostly insolubilized rhodamine and phloxine-dyes, which have a very low side-absorption in the blue region of the spectrum.

The warm colour standards are characterized by the use of insolubilized azo dyestuffs. Said dyestuffs are more resistant to solvents, e.g. alcohol, than the rhodamines and phloxines, but they possess a much higher side-absorption in the blue region of the spectrum.

It has been found experimentally that pigments, which are insoluble or very poorly soluble in water, and organic liquids of the alcohol or polyhydric alcohol type, e.g. glycerol, fulfil the requirements of resistants to diffusion. Pigment dyes that are applied from an aqueous dispersion are used preferably, though the use of substantive dyes that are chemically linked to a colloid or polymer is not excluded. For colour-proofing purposes the hardenable colloid layer contains pigments in a concentration so high that the optical density in the wavelength range of maximum absorption is at least 0.35.

Apart from the use of dyes, the absorption spectrum of which has to satisfy particular requirements for colour-proofing, all colours are considered e.g. cyan, light-cyan, magenta, warm magenta, black, yellow, green, brown, orange, red, white blue as well as metallic colours such as pale gold, rich gold, copper, and silver. In other words the term "colour" in the present invention is meant to encompass all pure and mixed colours as well as black-and-white.

Non-migratory pigments suitable for use in the present invention are known under the name "Pigmosol" and "Colanyl" dyes. "Pigmosol" and "Colanyl" are trademarks of Badische Anilin- & Soda-Fabrik A. G., Ludwigshafen (Rhine), W. Germany, for organic pigment dyes that are mixed with a dispersing agent for aqueous medium. These pigment dyes excel in resistance to light, heat, acids, bases, oxidizing agents, and solvent. They are insoluble in hydrophilic colloids such as gelatin.

The black pigment for the black-toned part image is preferably carbon black.

Even if the pigments are completely inert in the aqueous processing and washing liquids they may stain to some extent the permanent support at the non-exposed areas as a result of simple adhesion forces. In order to avoid a direct contact of the pigment(s) with the permanent support the pigment coating on the temporary support is over-coated with a hydrophilic colloid layer (top layer), which does not contain pigments or dyes for forming the image. On transfer of such composite coating the top layer comes into contact with the permanent support and is sandwiched between said support and the pigmented coating. The top layer contains the same colloid(s) as the coloured layer and is preferably of the same composition as the pigmented coating except for the presence of the visible image-forming pigment(s) or dyes thereon. The top layer, however, may contain a small amount of translucent pigments, e.g. silica particles, protruding from the layer and being a few microns thicker than the top layer. They avoid sticking of rolled up sheet material at relatively high (e.g. 60%) relative humidity. The top layer contains, e.g., 1 to 1.5 g. of gelatin per sq. m.

In order to obtain images with a good resolution, relatively thin radiation-sensitive coloured colloid coatings are preferred. Preferably they have a thickness in the range of 1$\mu$ and 15$\mu$. Good results are obtained with coloured colloid layers containing 2 to 10 g. of gelatin per sq. m. Very good results are obtained with coloured layers having a thickness of 4 to 5$\mu$ and containing 2.5 to 3 g. of gelatin per sq. m. The colloid layers preferably contain at least 50% by weight of gelatin.

The adhering power of the transferable coating to its temporary support, preferably a flexible one, has to be adjusted in such a way that an easy stripping off from the temporary support is possible after pressing the pigment coating into contact with the permanent support. Therefore, a relatively hydrophobic temporary support e.g. an unsubbed cellulose triacetate sheet, a polystyrene sheet, a polyester sheet or sheet of copoly(vinyl acetate/vinyl chloride) and a permanent support having a hydrophilic surface, e.g. a polyethylene terephthalate support subbed for adhering gelatin coatings is used preferably, e.g. a hydrophobic support subbed as described in the Belgian patent specification 721,469 filed Sept. 27, 1968 by Gevaert-Agfa N.V. According to a preferred embodiment the photosensitive coating is composed in such a way that its adherence to the temporary support in wet state is less than in dry state. This can be attained by the addition of hygroscopic agents, e.g. a water-soluble organic hygroscopic compound e.g. glycerol, and the use of wetting and plasticizing agents. After wash-off treatment the colloid relief pattern is preferably dehydrated (unswelled) with a water-attracting alkanol/water mixture preferably an ethanol/water mixture in order to provide a sufficient mechanical strength and to prevent damage when transferring a further colloid layer thereon. A temporary support having a repelling power for wet gelatin coatings is e.g. a paper base coated with a polyethylene layer, a paper base impregnated with wax, a paper base coated with a layer of cellulose nitrate or a paper base coated with a layer of insolubilized polyvinyl alcohol or a layer of alginic acid insolubilized with an alkaline earth metal salt.

The permanent support may be rigid as well as flexible and only must present by itself or by means of (a) subbing layer(s) a good adherence in wet as well as in dry state for the transferable hydrophilic colloid coating.

Depending on the use of the multicolour print the permanent support is transparent or opaque. So, it is possible to use metal layers or sheets, glass-ceramics, resin supports and paper impermeabilized for the processing and washing liquids.

For purposes such as colour-proofing wherein several exposures have to be effected in register it is necessary to use a resin support with high dimensional stability.

Resin supports characterized by a high mechanical strength and very low water-absorption and consequently high dimensional stability in dry and wet state can be formed from a linear polyester, e.g. a linear polyester e.g. polyethylene terephthalate. Good results as to dimensional stability are obtained with aluminium sheets sandwiched between two high wet-strength paper sheets although this material is rather expensive.

Permanent resin supports can be made opaque by coating them with a matted subbing layer or by matting or colouring them in the mass. The matting may be effected by pigments known therefor in the art, e.g. titanium dioxide, zinc oxide, and barium sulphate. Matting can also be obtained by producing a "blush-coat" as described e.g. in Canadian patent specification 654,438 of Labelon Tape Co., issued Dec. 18, 1962.

Hydrophobic resin supports to be used as permanent support according to the present invention are coated with one or more subbing layers for a hydrophilic colloid layer.

Preferred subbing layers for use on a permanent hydrophobic resin support, e.g. a polyethylene terephthalate support, are described in the Belgian patent specification 721,469 mentioned above. In the said specification, which has to be read in conjunction herewith, a sheet material is claimed that successively comprises a hydrophobic film support, a layer (A), which directly adheres to the said hydrophobic film support and comprises a copolymer formed from 45 to 99.5% by weight of at least one of the chlorine-containing monomers vinylidene chloride and vinyl chloride, from 0.5 to 10% by weight of an ethylenically unsaturated hydrophilic monomer, and from 0 to 54.5% by weight of at least one other copolymerisable ethylenically unsaturated monomer; and a layer (B) comprising in a ratio of 1:5 to 1:0.5 by weight a mixture of gelatin and a copolymer of 30 to 70% by weight of butadiene with at least one copolymerisable ethylenically unsaturated monomer.

Preferably the subbed permanent film support consists of a hydrophobic film support and the combination of the two anchoring subbing layers as described above. The hydrophobic film support may be a film of cellulose triacetate, polyethylene terephthalate, polycarbonate, polystyrene, polymethacrylic acid ester; etc. The subbed hydrophobic film support may be provided on only one side or on both sides with the combination of subbing layers.

A detailed description will now be given of the composition and structure of a preferred light-sensitive material, and of its use in the production according to the present invention of a multicolour image.

A coating composition is prepared containing gelatin dissolved in water wherein (a) selected pigment(s) is (are) dispersed in a concentration to yield after coating and drying a recording layer having an optical density in the wavelength range of maximal absorption of at least 0.4. The coating composition preferably contains at least 50% by weight of gelatin in respect of the pigment particles and a proper amount of plasticizing agent and repellent (a water-attracting compound e.g. glycerol) to provide to the coating a sufficient adherence to its temporary support and to enable its easy wet (aqueous) stripping off from the temporary support, e.g. an unsubbed cellulose triacetate or polyethylene terephthalate support. In addition to said ingredients the coating composition contains (a) diazonium compound(s) in an amount high enough to allow selective hardening after exposure. The amount of said diazonium compound is, however, such that the gelification of the gelatin is not substantially affected and optimum sensitivity is attained without reaching the concentration, at which the diazonium compound starts to crystallize from the dry layer. A suitable amount of diazonium compound(s) is in the range of 15 to 40% by weight in respect of the dry gelatin.

The coating preferably contains 1 to 10 g. of gelatin per sq. m. Optimal results are obtained with 3 g. of gelatin per sq. m.

In order to improve the storage stability of the recording layer its pH is kept rather low, e.g. below 2.5. Acids suited for that purpose are citric acid, tartaric acid, trichloroacetic acid, sulphosalicylic acid, phosphoric acid, boric acid, phytic acid and naphthalene-sulphonic acid.

In order to improve the sharpness of the graphic reproduction the gelatin layer may contain a screening dye.

A second coating, the so-called top-layer, the composition of which is preferably identical to the foregoing, except that no pigment(s) are present, is coated on the first one. The second coating preferably contains 0.5 to 5 g. of gelatin per sq. m. It is however, not strictly necessary to incorporate a radiation-sensitive diazonium compound in the said second coating, since a sufficient amount of said compound can diffuse during coating and drying therein from the underlying pigmented layer.

The said second coating forms with the underlying pigmented coating one hardenable double layer firmly bound together, in other words a "composite layer" which can be transferred as a whole from the temporary support to the permanent support.

A set of materials containing such a composite layer is preferably used for preparing a multicolour "colour proofing image." A usual set contains yellow, magenta, cyan, and black pigment coatings on separate cellulose triacetate supports.

The permanent support, e.g. a polyethylene terephthalate support, is successively coated with a first subbing layer on the basis of a copolymer containing hydrophobic and hydrophilic structural units in a proper ratio and a second subbing layer, which is more hydrophilic than the first one and contains gelatin, a hydrophobic latex polymer and a white pigment, e.g. titanium dioxide particles for conferring an opaque aspect to the support.

The permanent support preferably applied in colour proofing is a hydrophobic polyester resin support subbed with a system of subbing layers as described in the Belgian patent specification 721,469 mentioned above. The opaque white support has an opacity and whiteness resembling as much as possible the whiteness and opacity of the printing stock whereon the actual print has to be made.

The preparation of a multicolour "colour proof" then proceeds according to a preferred embodiment as follows.

To said permanent support subbed as described above the unexposed pigment coating is transferred by pressing the surface of the subbing layer and of the unexposed coating together in the presence of an aqueous liquid and peeling off the temporary cellulose triacetate support.

The transfer can be carried out in an apparatus, in which the materials involved are pressed together between rollers. A suitable apparatus for that purpose is described in the Belgian patent specification 740,292 filed Oct. 15, 1969 by Gevaert-Agfa N.V.

The said apparatus is particularly suitable for use in transferring in wet or moist state colloid layers from a temporary support to a permanent support and such apparatus comprises a pair of co-operating pressure rollers and means for driving said rollers, a first platform for supporting the permanent support prior to its engagement by said pressure rollers, said platform being formed in such a way as to make interrupted or discontinuous contact with the permanent support when this is placed thereon, a second platform arranged over and separated from the first surface for supporting at least the leading part of the temporary support to keep said temporary support separated from a permanent support when this is located on the first platform, the forward ends of both said platforms being disposed proximate to the nip of the pressure rollers so that the supports as they are advanced are gripped by said rollers and progressively pressed together.

After the transfer and drying e.g. with a hot air stream the photosensitive gelatin layer is exposed through a first halftone separation transparency, which in photodegradation systems is a halftone positive of the original. In a particular case of four-colour printing a cyan pigment coating is first applied to the permanent support and exposed through the cyan printer halftone separation positive of the original. After the exposure the photosensitive coating is treated with an aqueous liquid containing an aldehyde hardening agent hardening the coating in the unexposed portions, whereupon the exposed portions are washed away selectively with a jet of tap water preferably at 30–50° C. In successive order the same steps are carried out for the yellow, magenta, and black-pigmented coating, which are exposed in register on the same support carrying already the cyan pigment coating but respectively through the yellow printer halftone, magenta printer halftone and black printer halftone positive of the original. However, the order wherein the colour relief images are made can be chosen arbitrarily.

The exposure, preferably being a vacuum frame contact-exposure is carried out with a light source sufficiently emitting in the ultraviolet range of the spectrum, e.g. with a carbon arc, a xenon arc, or a high pressure mercury vapour tube. The duration of the exposure does not only depend on the photosensitivity of the diazonium compound but also on the type of the pigment, more particularly on its inherent absorption of ultraviolet radiation and blue light. In order to obtain a halftone relief having an optimal dot sharpness the pigment coating is exposed while being in direct contact with the image-containing layer of the transparent original.

The hardening of the photosensitive coating in its unexposed portions is preferably carried out with an aqueous solution of an aldehyde hardening agent or composition producing such agent in situ, e.g. an aqueous solution containing formaldehyde or bishydroxymethylurea. A quantity of 1–3 grams of formaldehyde per 100 g. of gelatin is sufficient to obtain satisfactory hardening.

Many other aldehydes have been described as active hardening agents for gelatin. Particularly suited in that respect are glyoxal, glutardialdehyde and mucochloric acid.

The choice of aldehyde hardener depends on the selectiveness of hardening between exposed and unexposed portions of the photosensitive coating and the effectiveness and speed of hardening desired with respect to a selected hardenable colloid.

Formaldehyde-hardeninng can be accelerated by the addition of glutardialdehyde.

Preferred hardening solutions contain 1 to 10 g. of formaldehyde per litre.

After the hardeninng step the exposed portions of recording layer that contain photodegraded gelatin are preferably washed off without mechanical rubbing by means of running water at a temperature preferably between 30 and 50° C. The relief image, which has absorbed an amount of water, is than preferably dehydrated (unswelled) in a dehydrating liquid, e.g. an alcoholic liquid containing 70 to 30% by volume of water and 30 to 70% by volume of ethanol. Excess of liquid is preferably removed by squeezing the relief between two smooth soft rollers, e.g. rubber rollers.

The permanent support carrying the first relief image (the cyan relief image) is pressed between the same rollers while in contact with another pigment coating, e.g. the yellow pigment coating, and after a few seconds of contact the temporary support is peeled off, thus overall transferring the yellow pigment coating on the cyan part image produced already. Said yellow pigment coating is dried before contact exposure. Drying proceeds, e.g., with an air current of 40° C.

The whole procedure of exposure (exposure in register), hardening treatment, washing-off, and dehydration is repeated for the yellow coating and the same applied for the magenta printer image and black printer image.

Accordinng to a special embodiment the hardening treatment and washing off proceeds with or in one and same liquid.

The obtained colloid pattern or multilayer colloid pattern can be protected and given a glossy appearance by a transparent resin topcoat, which according to a preferred embodiment is applied by spraying. A suitable "spray-cover" consists of polyisobutyl methacrylate.

The production of a multicolor proof is illustrated in more details in the following examples. The percentages are by weight if not otherwise stated.

EXAMPLE 1

(I) Preparation of the photosensitive coatings (A) Cyan photosensitive coating.—The following ingredients were mixed with each other at a temperature of 50° C.

| | |
|---|---|
| 20% aqueous gelatin solution ____g__ | 157.5 |
| 5% aqueous solution of Ultravon-W (trade name of Ciba AG Basel, Switzerland for a heptadecylbenzimidazole disodium sulphonate dispersion agent) ____ml__ | 8 |
| Cyanpigment dispersion containing 10 parts of Heliogenblau B Colanyl Teig (trade name of Badische Anilin- & Soda-Fabrik A.G., Ludwigshafen (Rhine), Germany); 10 parts of a 5% aqueous solution of Ultravon-W (trade name) ____ml__ | 25 |
| Water ____ml__ | 80 |
| Mixture of glycerol-water (1:9) ____ml__ | 63 |
| 3.5% aqueous solution of phytic acid ____ml__ | 36.75 |
| 5% aqueous solution (17/83) [1] ____ml__ | 5.25 |
| 11.7% solution of saponine in a mixture of ethanol-water (1:4) ____ml__ | 5 |
| p - (methyl - 2 - hydroxyethylamino) - benzene diazonium chloride·½ zinc chloride·2 water ____g__ | 10 |
| Water to make ____ml__ | 500 |

[1] Mixture of the formula:

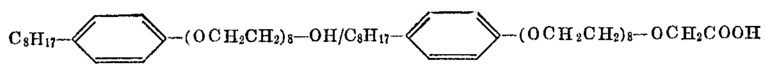

This mixture was coated at a ratio of 45 g./sq. m. and at 35° C. onto an unsubbed cellulose triacetate film being 0.10 mm. thick and serving as a temporary support.

(B) Yellow photosensitive coating.—The composition and preparation of the yellow pigment coating were the same as for the cyan pigment coating under (A) except that no cyan pigment but 75 ml. of a yellow pigment dispersion were used containing: 10 parts of Pigment Yellow 16 (C.I. 20,040) sold under the name Permanent Gelb NCG Colanyl Teig (trade name of Farbwerke Hoechst AG, Frankfurt (Main), Höchst, Germany).

(C) Magenta photosensitive coating.—The composition and preparation thereof was the same as that of the cyan pigment coating under (A) except that no cyan pigment dispersion but 45 ml. of a magenta pigment dispersion were used containing 10 parts of: Litholscharlach BBM Pigmosol (trade name of Badische Anilin- & Soda-Fabrik, Ludwigshafen (Rhine), Germany).

(D) Black photosensitive coating.—The composition and preparation thereof was the same as that of the cyan pigment coating under (A) except the 4 ml. of the described cyan pigment dispersion were used together with 52.5 ml. of aqueous carbon black dispersion prepared by ball-milling and dispersing 20 g. of carbon black in 77 ml. of Ultravon-W (trade name).

(II) Preparation of the permanent support

A biaxially stretched polyethylene terephthalate film of 180$\mu$ thickness was subbed at both sides with the following composition at 25–30° C. at a ratio of 1.6 g./sq. m.:

| | | |
|---|---|---|
| Copolymer of vinylidene chloride, N-tert.-butylacrylamide, n-butyl acrylate, and N-vinylpyrrolidone (ratios by weight: 70:23:3:4) | g. | 5.5 |
| Methylene chloride | ml. | 65 |
| 1,2-dichloroethane | ml. | 35 |

The resulting layer was coated with a mixture prepared as follows: 1350 g. of titanium dioxide (average particle size: 0.11$\mu$) were dispersed in 5 l. of water containing 25 ml. of Dequest 2006 (trade name of Monsanto Chemical Company, St. Louis, Mo. U.S.A. for a dispersing agent corresponding to the following structural formula:

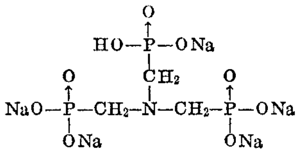

The dispersion was stirred rapidly for 10 min. at a temperature of 5 to 15° C. and then heated to 35° C., at which temperature 400 ml. of a 10% aqueous solution of gelatin was added, while rapid stirring was continued. Subsequently the following composition was added by stirring slowly to avoid scumming:

| | Ml. |
|---|---|
| 10% aqueous solution of gelatin | 1800 |
| Water | 130 |
| 20% latex of the copolymer of butadiene and methyl methacrylate (ratio by weight 50:50) | 2500 |
| 10% aqueous solution of the sodium salt of oleylmethyltauride | 37.5 |
| Ethylene chlorohydrin | 500 |

The coating was carried out at such a ratio that upon drying a layer of 5$\mu$ was obtained.

(III) Processing

The permanent support was imbibed for 1½ minute in an ethanol-water mixture. The volume ratio of ethanol and water was between 1 and 6:1 but preferably between 2:1.

The cyan pigment coating on its temporary support was pressed in wet state between soft rollers in contact with the described wetted permanent support. After a contact time of 30 sec. the temporary support was stripped off, thus leaving the cyan pigment coating fixed on the permanent support. The transferred coating was air-dried and put in a vacuum frame in contact with the cyan printer separation halftone positive of a multicolour original to be printed.

The pigment coating was exposed for 3 min. with a carbon arc light source (1 x 40 amp) placed at a distance of 70 cm.

The exposed pigment coating was dipped for 135 sec. in a tray containing the following hardening composition:

| | | |
|---|---|---|
| Sodium acetate | g. | 40 |
| Borax | g. | 2.6 |
| Boric acid | g. | 26 |
| 40% aqueous formaldehyde | ml. | 50 |
| 25% aqueous glutardialdehyde | ml. | 3.2 |
| Ethanol | ml. | 350 |
| Water | ml. | 600 |

The relief was developed by washing without rubbing in running water having a temperature of 35° C. Subsequently, the relief image was dipped for 1 min. in a mixture of ethanol and water (70:30% by volume).

In the same way as described for the cyan pigment coating, the yellow, magenta and black pigment coatings were transferred onto the already formed relief image and each exposure carried out in register through the proper halftone selection positives. The exposure times were adapted to the sensitivity of the differently pigmented recording layers.

The obtained multicolor image built up of superposed cyan, yellow, magenta and black relief images serves as proof for the printer to judge of the quality of the cyan, yellow, magenta and black printer halftone selection positives.

EXAMPLE 2

Example 1 was repeated but the amonut of phytic acid used was replaced by 4 g. of citric acid.

EXAMPLE 3

Example 1 was repeated but instead of 10 g. of p-(methyl-2-hydroxyethylamino)-benzene diazonium chloride·½ zinc chloride·2 water, 10 g. of p-(diethylamino)-benzene diazoniumchloride·zinc chloride were used.

EXAMPLE 4

Example 1 was repeated but each pigment coating after coating on its temporary support was covered with an anti-stress layer applied from the following composition at a ratio of 33 g./sq. m.:

| | | |
|---|---|---|
| Gelatin | g. | 135 |
| 10% aqueous dispersion of silica particles (average particle size 2–3$\mu$) in 8% aqueous gelatin solution | g. | 30 |
| 11.7% solution of saponine in a mixture of ethanol-water (1:4) | ml. | 20 |
| Tergitol 4) trade name for 7-ethyl-2-methyl-4-undecanol ester of sodium bisulphate marketed by Union Carbide and Carbon, New York, U.S.A.) | ml. | 15 |
| Water till 1000 ml. | | |

EXAMPLE 5

Example 4 was repeated but to the antistress layer coating composition 7 g. of 70% aqueous solution of phytic acid and 100 ml. of water were added before bringing the volume up to 1000 ml.

EXAMPLE 6

Example 5 was repeated but the phytic acid was replaced by 8 g. of citric acid.

EXAMPLE 7

Example 4 was repeated but before bringing the coating composition of the antistress layer up to a volume of 1000 ml. the following mixture was added:

| | | |
|---|---|---|
| 70% aqueous solution of phytic acid | g. | 1.5 |
| Diazo compound of Example 1 | g. | 8.5 |
| Water | ml. | 500 |

EXAMPLE 8

Example 4 was repeated but before bringing the coating composition of the anti-stress layer up to a volume of 1000 ml. the following mixture was added:

| | | |
|---|---|---|
| Boric acid | g. | 3 |
| Diazo compound of Example 3 | g. | 8.5 |
| Water | ml. | 500 |

EXAMPLE 9

A polyester film, suitable for writing on with ink or pencil, a so-called drafting film consisting of a polyethylene terephthalate support double side coated with a semitransparent layer on the basis of titanium dioxide dispersed in hardened gelatin containing a latex polymer such as a copolymer of vinyl chloride, vinylidene chloride, n-butyl acrylate and itaconic acid (63:30:5:2) mole percent was used as permanent support for coating thereon at a ratio of 45 g. per sq. m. a black photosensitive layer from the following composition:

| | | |
|---|---|---|
| 14.5% aqueous solution of gelatin | g. | 240 |
| For wetting purposes a 10% aqueous solution of the wetting agent [1] | | 4.5 |
| A carbon black dispersion marketed under the trade name: Russdispersion P 130 by Degussa, Frankfurt (Main), W. Germany | g. | 5.4 |
| Heliogenblau B Colanyl Teig (a cyan pigment dispersion marketed by Badische Anilin- & Soda-Fabrik A.G., Ludwigshafen (Rhine), Germany | g. | 0.4 |
| Combined with: | | |
| 10% aqueous solution of the above cited wetting agent | ml. | 9 |
| Glycerine-water mixture (1:9) | ml. | 63 |
| 20% aqueous solution of citric acid | ml. | 20 |
| 4 - (N - hydroxyethyl-N-ethylamino)-phenyl diazonium chloride·zinc chloride | g. | 10 |
| Water | ml. | 136 |

[1] Formula:

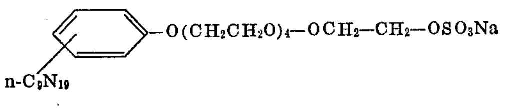

The coated layer was dried at a temperature of 20–30° C.

The dried photosensitive recording layer was exposed in direct contact with a tracing paper provided with a drawing of a machine part in black ink. The exposure was carried out for 10 sec. with a 1000 watt ultra-violet light bulb placed at a distance of 10 cm. from the photosensitive coating.

After exposure the exposed portions of the recording layer were washed-off with running water of 15–25° C. A positive black image on a semitransparent support was obtained.

Instead of using in the exposure the said ultraviolet light bulb a flash lamp emitting in the ultra-violet range can be used e.g. a flash lamp operating with 4 kv.

By treating the exposed layer before the wash-off treatment with a hardening solution of the following composition:

| | Ml. |
|---|---|
| 40% aqueous solution of formaldehyde | 30 |
| 25% aqueous solution of glutardialdehyde | 7 |
| Ethanol | 250 |
| Water to 1 liter. | |

An image with an improved sharpness and better resistivity against scratching was obtained.

Other suitable drafting films that can be used as support for the photosensitive hydrophilic colloid layers applied according to the present invention are described in the Dutch patent application 7001115 filed Jan. 27, 1970 by Gevaert-Agfa N.V. corresponding with the United Kingdom patent application 7,391/69 filed Feb. 11, 1969 by Gevaert-Agfa N.V. These films behave like tracing paper e.g. allow a drawing or pattern to be retouched and are written on easily with pencil and ink.

EXAMPLE 10

Example 9 was repeated except for the fact that the photosensitive coating was applied from a following coating composition:

| | | |
|---|---|---|
| 10% aqueous gelatin solution | ml. | 140 |
| 15% aqueous carbon black dispersion containing 2% of poly(N-vinylpyrrolidone) | ml. | 40 |
| 5% aqueous solution of the wetting agent Tergitol 4 (trade name for 7-ethyl-2-methyl-4-undecanol ester of sodium bisulphate marketed by Union Carbide and Carbon, New York, U.S.A.) | ml. | 10 |
| Citric acid | g. | 2 |
| 4-(N-diethylamino) - phenyldiazonium chloride·zinc chloride | g. | 5 |
| Water | ml. | 105 |

We claim:

1. A process of producing a coloured colloid relief pattern from at least one coloured colloid layer consisting essentially of a water-soluble hydrophilic colloid binder containing colorant material and a diazonium compound undergoing decomposition when exposed to active electromagnetic radiation, said hydrophilic binder being normally adapted to undergo hardening to a water-insoluble condition upon reaction with an aldehyde but being inhibited from undergoing said hardening reaction by the diazonium compound decomposition products, which comprises the steps of:

(1) bringing a temporary support carrying one such coloured colloid layer into contact with a permanent support in the presence of an aqueous liquid under pressure and separating said supports to transfer said colloid layer in entirety to said permanent support, (2) drying the transferred colloid layer, (3) exposing a dry colloid layer imagewise to active electromagnetic radiation to decompose the diazonium compound and release the decomposition products thereof in the exposed areas of said layer, (4) contacting the thus exposed colloid layer with an aldehyde to harden the hydrophilic binder thereof in the unexposed areas of the layer while the exposed areas are inhibited against such hardening by the presence of the decomposition products of said diazonium compound, and (5) washing the differentially hardened colloid layer with an aqueous liquid to remove the exposed and unhardened areas thereof, leaving the unexposed hardened areas intact as a colored relief image on said permanent support.

2. A process according to claim 1 wherein a coloured pattern constituted of a plurality of superposed differently colored colloid layer sections is produced, the above-recited steps of contacting, exposing, developing, drying, hardening and washing being repeated for each of said plurality of coloured colloid layers until the desired multicolor pattern is obtained.

3. A process according to claim 1, wherein the permanent support is opaque.

4. A process according to claim 1, wherein the exposure is carried out through a half-tone or linework transparency.

5. A process according to claim 1, wherein each such coloured hardenable colloid layer on its temporary support is covered with a substantially uncolored top layer containing the same colloid as the coloured colloid layer therebeneath.

6. A process according to claim 1, wherein each such coloured hardenable colloid layer has a thickness in the range of 1μ to 15μ.

7. A process according to claim 1, wherein the colored colloid layer contains a pigment that is dispersible in water.

8. A process according to claim 1, wherein the colloid layer contains a water-soluble hydrophilic hardenable colloid that possesses the property of sol-gel transformation.

9. A process according to claim 8, wherein the colloid layer comprises gelatin.

10. A process according to claim 1, wherein the colloid layer contains a diazo compound derived from 1,2- and 2,1-amino naphthols, 1,4-amino naphthols and aromatic p-diamines of the benzene series.

11. A process according to claim 1, wherein the permanent support is a hydrophobic resin support carrying a surface subbing layer with hydrophilic properties.

12. A process according to claim 11, wherein the permanent support comprises a hydrophobic film support having superposed thereon in succession a layer (A), which directly adheres to said hydrophobic film support and comprises a copolymer formed from 45 to 99.5% by weight of at least one of the chlorine-containing monomers vinylidene chloride and vinyl chloride, from 0.5 to 10% by weight of an ethylenically unsaturated hydrophilic monomer, and from 0 to 54.5% by weight of at least one other copolymerisable ethylenically unsaturated monomer, and a layer (B) comprising in a ratio of 1:3 to 1:0.5 by weight a mixture of gelatin and a copolymer of 30 to 70% by weight of butadiene with at least one copolymerisable ethylenically unsaturated monomer.

13. A process according to claim 1, wherein after said washing step the colloid relief pattern is subjected to a dehydration treatment with a mixture of water-attracting alkanol and water.

14. A process according to claim 1, wherein the colloid layer containing the diazonium compound, after information-wise exposure to active electromagnetic radiation is treated with an aqueous liquid containing formaldehyde and/or glutardialdehyde.

15. A process according to claim 1, wherein the hardenable colloid layer contains gelatin and the washing step is effected without mechanical rubbing by means of running water having a temperature between 30 and 50° C.

16. The process of claim 1 wherein said diazonium compound is present in the amount of about 15–40% by weight of said colloid.

17. The process of claim 1 wherein said exposing radiation includes ultraviolet light.

18. A photosensitive recording material comprising a coloured hydrophilic colloid layer consisting essentially of a diazonium compound, and a dye and/or pigment colouring matter contained within a hydrophilic colloid binding agent that is capable of undergoing hardening on reaction with an aldehyde.

19. A photosensitive recording material according to claim 18, wherein said hydrophilic colloid is a proteinaceous colloid.

20. A photosensitive recording material according to claim 19, wherein said hydrophilic colloid is gelatin.

21. A photosensitive recording material according to claim 18, wherein the diazonium compound is a diazonium salt derived from 1,2- and 2,1-amino naphthols, 1,4-amino naphthols or aromatic p-diamines of the benzene series.

22. A photosensitive recording material according to claim 18, wherein the hydrophilic colloid layer is carried on a transparent support.

23. A photosensitive recording material according to claim 18, wherein the hydrophilic colloid layer is carried on a drafting film serving as support.

24. The process of claim 18 wherein said diazonium compound is present in the amount of about 15–40% by weight of said colloid.

25. A process for the production of a coloured colloid relief pattern comprising the steps of (1) imagewise exposing to active electromagnetic radiation a coloured water-soluble hydrophilic colloid layer which is capable of undergoing hardening by reaction with an aldehyde and contains a diazonium compound decomposable on exposure to said radiation, (2) contacting the exposed layer uniformly with an aldehyde, and (3) thereafter subjecting the layer to washing with an aqueous liquid, whereby the exposed portions of said colloid layer are removed, leaving the unexposed areas intact to form said relief pattern as a consequence of the selective hardening action of said aldehyde for the areas of said colloid layer free of the diazonium compound decomposition products.

26. A process according to claim 25, wherein the hydrophilic colloid layer contains a proteinaceous colloid as hydrophilic aldehyde hardenable colloid.

27. A process according to claim 26, wherein the proteinaceous colloid is gelatin.

28. A process according to claim 25, wherein the hydrophilic colloid layer already before its exposure contains a dye and/or pigment particles for colouring said layer.

29. A process according to claim 25, wherein the hydrophilic cololid layer has been applied onto a transparent support.

30. The process of claim 25 wherein said diazonium compound is present in the amount of about 15–40% by weight of said colloid.

References Cited

UNITED STATES PATENTS

| | | | |
|---|---|---|---|
| 3,110,592 | 11/1963 | Scherwin et al. | 96—91 |
| 3,138,460 | 6/1964 | Levinos | 96—49 |
| 1,926,620 | 9/1933 | Herzog | 96—15 |
| 1,972,311 | 9/1934 | Nicoll | 96—15 |
| 2,050,552 | 8/1936 | Baker | 96—15 |
| 2,327,304 | 8/1943 | Grant | 96—15 |

NORMAN G. TORCHIN, Primary Examiner

E. C. KIMLIN, Assistant Examiner

U.S. Cl. X.R.

96—15, 49, 75, 91, 83, 113